United States Patent [19]

Pringle

[11] Patent Number: 5,179,399
[45] Date of Patent: Jan. 12, 1993

[54] THEATRE IN THE ROUND PROJECTION APPARATUS AND METHOD

[76] Inventor: David A. Pringle, 16749 Bollinger Dr., Pacific Palisades, Calif. 90272

[21] Appl. No.: 645,232

[22] Filed: Jan. 24, 1991

[51] Int. Cl.$^5$ .................. G03B 21/56; G03B 37/04
[52] U.S. Cl. ................... 353/94; 353/79; 353/30; 353/121; 359/451; 352/69
[58] Field of Search ............ 353/11, 94, 79, 122, 353/30, 48, 28, 121; 352/69, 70; 359/443, 451

[56] References Cited

U.S. PATENT DOCUMENTS

| | | | |
|---|---|---|---|
| 2,931,267 | 4/1960 | Hoch | 352/70 |
| 2,942,516 | 6/1960 | Disney et al. | 352/70 |
| 3,370,505 | 2/1968 | Bryan | 353/94 |
| 4,129,365 | 12/1978 | Aversano et al. | 353/94 |
| 4,167,311 | 9/1979 | Pund | 353/94 |
| 4,641,918 | 2/1987 | Moffatt et al. | 352/69 |
| 4,991,955 | 2/1991 | Vetter | 353/48 |

Primary Examiner—William A. Cuchlinski, Jr.
Assistant Examiner—William C. Dowling
Attorney, Agent, or Firm—Ladas & Parry

[57] ABSTRACT

A projection system for a theatre in the round having a plurality of moving image projectors. The projectors can be either film projectors or television-type projectors. They project in an essentially cylindrical surface which is viewed by people at a viewing location. A lens is associated with each moving image projector, the lens having an optical axis located at or above a top edge of the viewable portion of the cylindrical surface. A source of moving images is associated with each lens, the center of which source is located above the optical axis of the associated lens such that moving images are projected by each lens downwardly toward a portion of the essentially cylindrical surface in an essentially distortion-free manner.

11 Claims, 2 Drawing Sheets

THEATRE IN THE ROUND PROJECTION APPARATUS AND METHOD

BACKGROUND OF THE INVENTION

This invention relates to a projection apparatus and method which maybe used in a theatre in the round so as to project moving images on a 360°, or less, cylindrical screen.

BACKGROUND OF THE INVENTION

In recent years, large screen theatres have become quite popular. One technique has employed a single camera to project an image on a curved surface, such as the dome of a planetarium. This has been used, for example, at the Fleet Space Theatre in San Diego, Calif. Other single projector systems have been used, such as the well known Imax System.

It has also been known in the prior art to use systems employing multiple projectors, such as the Circlevision Theatre located at Disneyland in Anaheim, Calif. FIG. 1 is a schematic plan view of that theatre. It employs nine screen segments 10A-10H, 10J which define a 360° cylindrical surface. Between each of the nine segments 10 there are provided blackout areas 11 which are each approximately twelve inches wide. The blackout areas 11 are black areas of the screen, so light does not reflect from those areas and a projection opening 14. The projection opening 14 is located in the middle of each blackout area, that is, midway between the adjacent screen segments 10 and midway between the tops 16 and bottoms 15 of the adjacent screen areas. The projection opening 14 provides the opening through which a camera projector lens 12 can be seen in FIG. 2. The projector lens 12 projects an image to the screen segment on the opposite side of the viewing area 18 located in the middle of the cylinder defined by the screen segments. The phantom lines in FIG. 1 depict the projection of the images for lens 12D. The lenses 12 are set back from the screen segment surfaces to help conceal the lenses 12 from the audience in the viewing area 18. Thus, the openings 14 should be sized so that the projected image will fall upon the screen segment on the opposite side of the viewing area. The bottom edge 15 of the screen segments 10 is located at a height above the floor of the viewing area 14 so that the projected images are not projected upon the people viewing the presentation. Due to the location of the projection opening 14 in the middle of the blackout areas 11, it has proved difficult to completely shield the lenses 12 from the viewers in viewing area 18. Since there are nine screen segments 10, nine projector lens 12 are provided, one for each screen segment. In the installation at Disneyland, the viewing area is merely a carpeted surface with a number of hand rails disposed at various locations so that the viewing audience can stand, watching the presentation, and easily move about slightly so that they can watch the action on the approximately 360° presentation. Because of the blackout areas 11, the projected image is somewhat less than 360°.

An odd number of segments 10 are used so that the projector associated with each lens 12 is located directly opposite the screen segment 10 upon which its projected image is displayed. A conventional movie projector 13 is associated with each lens 12 and screen segment 10.

This prior art technique suffers from a number of drawbacks. First, the blackout areas 11 mean that the projected images on the screens do not fill a 360° cylindrical surface, because the cylindrical surface is broken up by the blackout areas 11. Second, since the lenses 12 are located midway between the bottom 15 and the top of a screen segment 10, that means that light projected on the screen segment on the opposite side of the viewing area 18 is reflected back towards the two screen segments on either side of the lens 12 from which the light initially emanated. This limits the amount of light which can be used to project the images because the reflected light tends to wash out the images portrayed on the screen due to the light reflected from the other side of the viewing area 18.

BRIEF DESCRIPTION OF THE PRESENT INVENTION

The present invention provides a projection system for a theatre in the round having a plurality of moving image projectors and an essentially cylindrical surface for display of projected moving images. The projector system includes lenses associated with the moving image projectors, the lenses each having an optical axis located at or above the top edge of the cylindrical surface. A source of moving images is associated with each lens, a center of which source is located above the optical axis of its associated lens such that moving images are projected by each lens downwardly toward a part of the essentially cylindrical surface in an essentially distortion-free manner.

DETAILED DESCRIPTION

Figure 1:
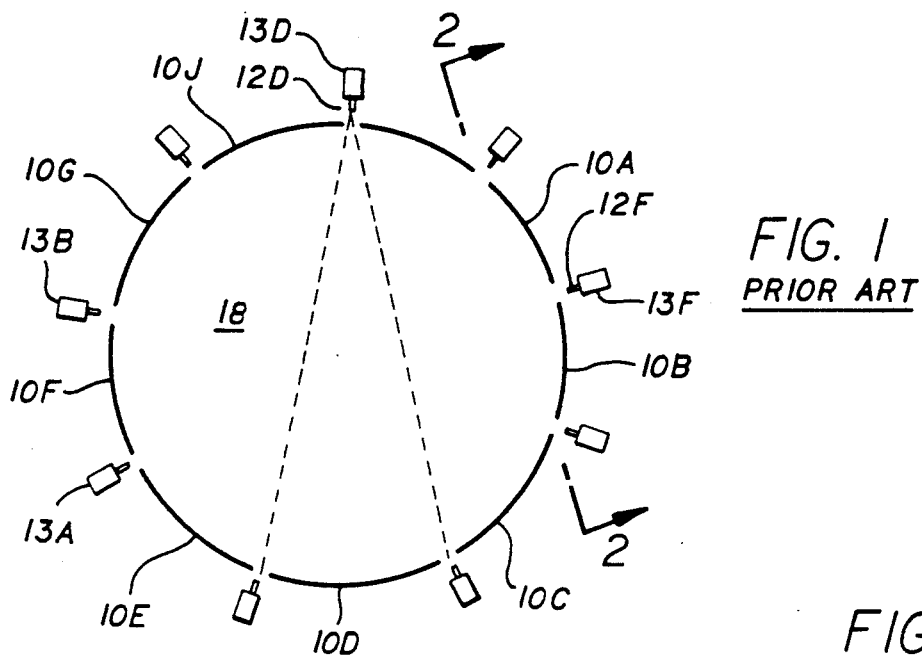
FIG. 1 is a schematic plan view of a theatre in the round of the type known in the prior art.
Figure 2:
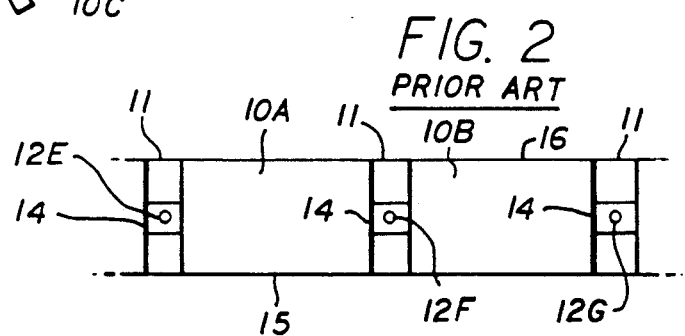
FIG. 2 is an elevational view of a portion of the theatre in the round of the type known in the prior art.

As already discussed, FIG. 1 is a top plan view of a known theatre in the round and FIG. 2 is a side elevational view showing how two of its screen segments, 10A and 10B, are juxtaposed to each other on either side of a blackout area 11 behind which one of the projection apparatuses 13F (FIG. 1) is housed. An associated lens 12F of the projection apparatus 13F projects moving images through a projection opening 14 in each blackout area 11. There is one projection apparatus 13 and associated lens 12 corresponding to each screen segment 10. As indicated above, this type of theatre in the round has been used for a number of years at Disneyland in Anaheim, Calif.

Figure 3:
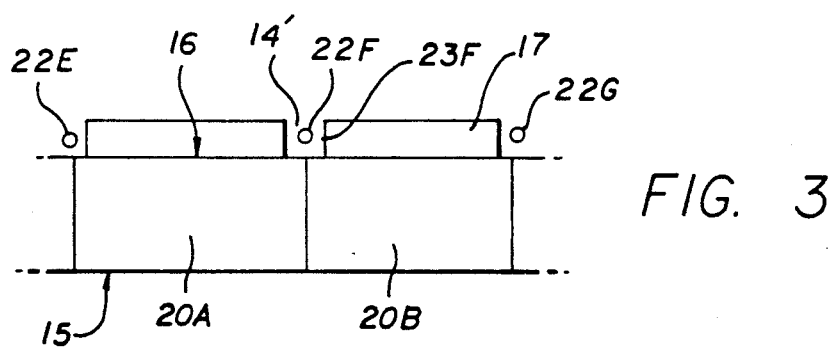
FIG. 3 is a view similar to FIG. 2, but modified in accordance with the teachings of the present invention.
Figure 4:
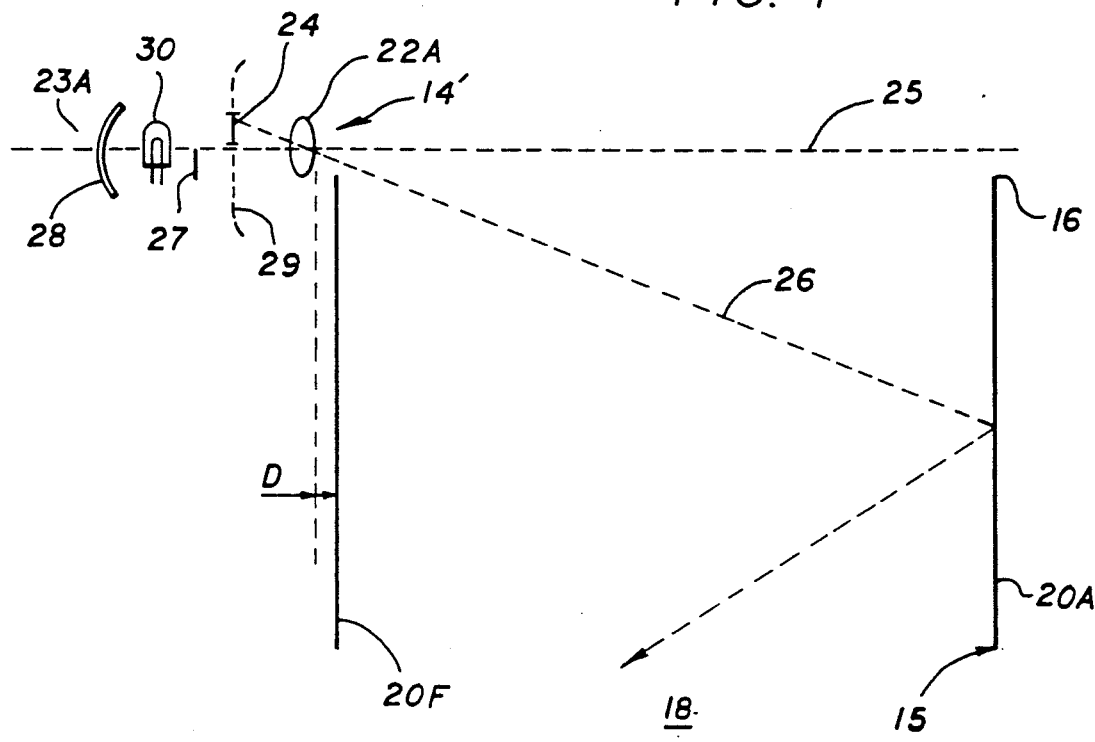
FIG. 4 is a schematic side elevational view of the projector system following the teachings of the present invention.

FIG. 3 is similar to FIG. 2 in that it shows two screen segments, here numbered 20A and 20B, juxtaposed to each other but, in this case, the present invention does away with the wide blackout areas 11 of FIG. 2. In accordance with my invention, the projection apparatuses 23 (see also FIG. 4) are positioned so that their associated projecting lenses 22 are located at or above a top edge 16 of the viewable area of the segments 20. A blackout ring or curtain 17 may be placed immediately above the segments 20 for aesthetic purposes. Projection openings 14' are provided, but they do not interrupt the continuity of the 360° screen surface. In FIGS. 3 and 4, the numbering of the projector apparatuses 23 include an appended letter identifying the particular screen segment with which they are associated. Thus, in FIG. 3, projector apparatus 23F projects moving images to screen segment 20F (FIG. 4) on the opposite side of viewing area 18.

The screen segments 20 are arranged to form a cylinder, such as that depicted in FIG. 1, except that the gap between adjacent segments 20 can be made much smaller, and therefore can even disappear. Indeed, a continuous cylindrical surface can be used for projection, if desired. For reasons which will be discussed subsequently, I prefer to use individual segments of the design discussed with reference to FIG. 6. As such, the surface upon which the moving images are projected may be a complete cylinder or there may be small breaks or blackout areas between the adjacent cylinder segments 20, as a matter of design choice. But the size of the blackout areas, if used, can be made much smaller since they do not have to be as wide as the projection openings 14 used in the prior art.

FIG. 4 is a schematic, side elevational view of my new projector system. Two screen segments 20A and 20F are shown on either sides of the viewing area 18. A lens 22A is shown above and slightly behind the adjacent screen 20F and its optical axis 25 is located above the top edge 16 of that screen segment 20F, as well as above the top edges of the other screen segments. The projector apparatus 23A also includes a lamp 30 and a reflecting mirror 28 located on the optical axis 25. A single frame 24 from a length of film or a movie 29 is depicted. The motor, film 29 sprockets, take-up and source reels and shutter assembly normally found in a movie projector are not shown for the sake of clarity. Element 27 is a gate or reflecting mirror which keeps light from passing from lamp 30 and/or mirror 28 to that portion of film 29 located below optical axis 25.

It should be noted that frame 24 is located above the optical axis 25 and those skilled in the art will appreciate that the image at frame 24 can be projected through lens 22 to the screen 20A without distortion. If the center of frame 24 were located on the optical axis 25, then in order to project the image on frame 24 to screen 20A would require that the optical axis be rotated downwardly so that it would be aimed toward the center of screen segment 20A. Those skilled in the art will appreciate, of course, that if such an arrangement were utilized, that would cause the square or rectangular image on frame 24 to take on a parallelogram shape at screen segment 20A, thereby distorting the image.

By locating the frame 24, whose image is being projected through lens 22A to screen 20A, above the optical axis 25, and further by locating the optical axis parallel to the tops of the viewable portion of the screen segments, the square or rectangular shape of the image on frame 24 is maintained when it is projected on screen segment 20A.

Since the lens 22 is located above the top edge 16 of the viewable area of the screen segments 20, no blackout area 11, such as is used in the prior art, is required. This is advantageous since now the image is no longer broken up so substantially. If a blackout area is used, it can be made smaller than the diameter of the lens used.

In addition to the advantage of doing away (either totally or substantially) with blackout area 11, the present invention has another advantage. Beam 26 shows a beam of light emanating from lens 22A and reflecting off screen 20A toward the viewing area 18 where the people watching the moving images would be located. The prior art technique causes the beam of light, except for its scattering, to be reflected in a general direction back toward the lens 12 from which it emanates. That causes the scenes on the adjacent screens to be washed out. Of course, the audience can still view the presentation, due to the scattering which occurs at screen segments 10, but washing out can occur. The present invention causes less washing out to occur compared to that which occurs in the prior art since the light bouncing off of a screen segment 20 has a generally downward component associated with it so that less light is reflected across the viewing area 18 and therefore less washing out occurs on the screens 20 immediately adjacent projector 23 than occurs in the prior art.

Those skilled in the art will appreciate that the diameter of lens 22 is approximately doubled compared to the diameter of the lens if the center of frame 24 were located on optical axis 25. That means, of course, that the cost of the lens 22 increases. However, the cost associated with increasing the lens size is really de minimus compared to the total cost of installing a theatre in the round, and therefore the cost is easily justified by the improved images which are projected in accordance with the present invention.

Figure 5:
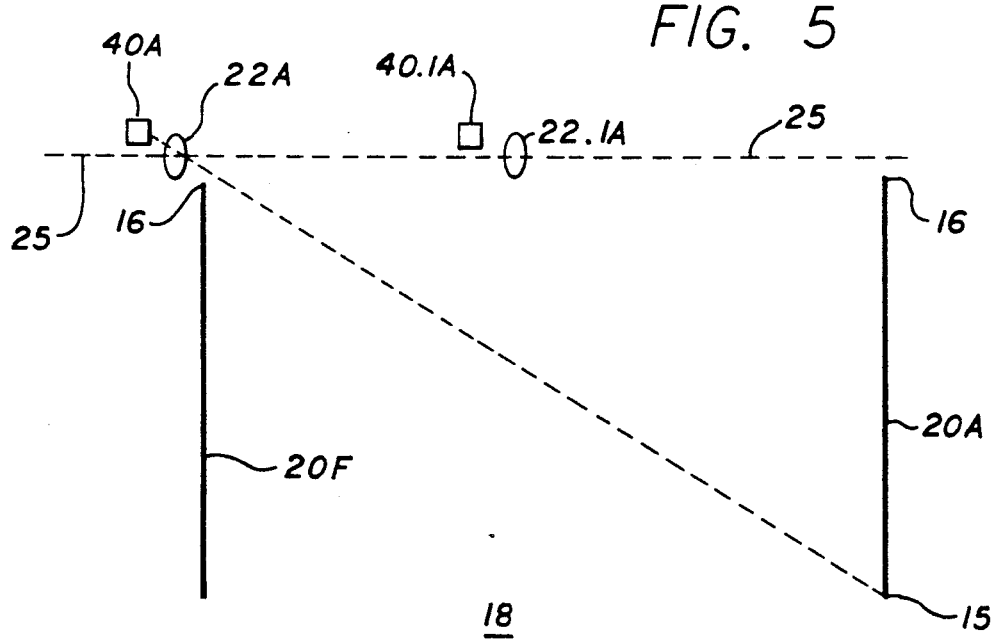
FIG. 5 is a top plan view of a portion of the theatre round showing how two screen segments may be positioned relative to each other.

Instead of using a modified movie projector 23 such as has been described with reference to FIG. 4, other moving image projectors 40A, such as television projection apparatuses, can alternatively be used, provided that the moving image source 40A is located above the optical axis 25 of the associated lens 22A as depicted in FIG. 5. Also, instead of locating the lens 22A and associated projecting apparatus 23A or 40A immediately above and typically slightly behind a screen segment 20F, such apparatus can instead be located above the viewing area 18, more or less at the center of the auditorium area as shown in FIG. 5, where a lens 22.1A and a projection apparatus 40.1A are shown. Shifting the optical axis of lens 22, 22A above the top edge 16 of the screen 20 permits the projection apparatus to be located well above the viewing area 18. If those practicing the present invention decide to locate the various lenses associated with the screen segments near the center of the cylinder formed by the screen segments 20 as opposed to at or slightly behind the cylindrical plane defined by the screen segments as shown for the lenses 22A–G in FIGS. 3, 4 and 5, the projecting apparatus 40.1A can be located higher above the audience area 18 than the prior art would permit.

The lens 22A is disposed a distance D behind the viewable surface of screen segments located immediately below it. That permits the lens to be concealed from persons in the viewing area 18. When the lenses 22 are located above the top 16 of the viewable screen areas, they seem to be more easily concealed than are lenses 12 of the prior art.

No projection window pane should be used in opening 14'. Rather, a bellows assembly (not shown) coupling the lenses 22 to their associated openings 14' should preferably be used to block out projector noise (assuming relatively noisy mechanical projectors 23 are used from the viewing area 18).

Of course, those skilled in the art will appreciate that when a television projection unit 40A or 40.1A is used, that will typically require that three lenses 22A or 22.1A and three projectors 40A and 40.1A be used in connection with each screen segment 20 so that color productions can be used.

Figure 6:
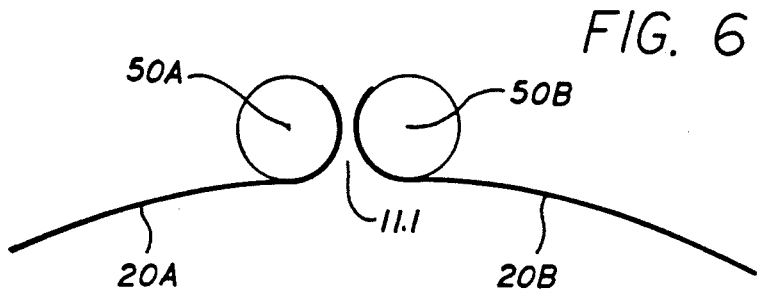
FIG. 6 is an enlarged top plan view showing a joint between two screen segments.

FIG. 6 is an enlarged top plan view showing a joint 11A between two screen segments 20A and 20B. Here, the screen's segments are wrapped around or follow cylindrical structures 50A and 50B, which cylindrical structures may be used, if desired, to help support the projection apparatus 23 or 40. In any event, the joint 11.1A formed thereby creates a small blackout region or at least a region where the light reflection capability of the screen is decreased due to the bending of the screen surface around the cylindrical structures 50A and 50B and away from the viewing area 18. This reduction means that, for the viewers in the viewing area 18, there is effectively a gray area between the screen segments 20A and 20B which has less capability to reflect light to them. This can be advantageously used since, when screens 20A and 20B have images projected thereon, there is normally a small amount of overlap between the projected images in the region of joint 11.1 and joint 11.1 will result in a smoother blending of images as they move from one screen segment to the next screen segment. The grey area will help to smooth out and blend together any misalignments of the taking cameras and/or the projection system and will help to counterbalance the fact that there is increased light levels being projected on that area due to the overlap between the projected images at joint 11.1. Thus, I prefer to use screen segments as shown in FIG. 6 in combination with the projection systems described with reference to FIGS. 3, 4 and 5.

Having described my invention with respect to certain preferred embodiments thereof, modification may now suggest itself to those skilled in the art. The invention is not to be limited to the embodiments disclosed above, except as required by the appended claims.

I claim:

1. A projection system for a theatre in the round having a plurality of moving image projectors and an essentially cylindrical surface for display of projected moving images, said projection system comprising:
   (a) lenses associated with said moving image projectors, the lenses each having an optical axis located at or above a top edge of the moving images projected on said essentially cylindrical surface; and
   (b) a source of moving images associated with each moving image projector and with each lens, the center of which source is located offset from the optical axis of its associated lens such that moving images are projected by each lens downwardly towards said essentially cylindrical surface in an essentially distortion-free manner.

2. The projection system of claim 1, wherein said source of moving images comprises movie films and wherein said moving image projectors comprises movie projectors, each movie projector including means for holding a frame of film being projected so that a center of said frame of film is offset from the optical axis of the lens associated with the movie projector.

3. The projection system of claim 1, wherein said moving image projectors are television projector units.

4. The projection system of claim 1, wherein said lens is located above and rearward of a portion of said cylindrical surface.

5. A method of projecting moving images on a generally vertical cylindrical surface comprising the steps of:
   (a) locating a plurality of lenses such that their optical axes are located in essentially a common plane above said cylindrical surface; and
   (b) projecting moving images from projector and through each lens, the optical axis of the projected moving images impinging each lens being offset from the optical axis of its associated lens such that the light from the projector passes through the lens and has a downward component when it falls on said cylindrical surface.

6. The projector system of claim 1, wherein said essentially cylindrical surface is divided into a group of segments, the number of segments in the group corresponding to the number of moving image projectors provided in the projection system, each moving image projector projecting an image downwardly toward its associated segment of said essentially cylindrical surface.

7. The projector system of claim 1, wherein said source of moving images is located above the optical axis of its associated lens.

8. The method of claim 5 wherein said plurality of lenses are located spaced around said cylindrical surface.

9. The method of claim 8, wherein the optical axis of the moving images projected from the projector are located above the optical axis of the lens through which the moving images are projected, such that the light forming the moving images, after passing through its lens has only downward components when it falls upon said cylindrical surface.

10. The method of claim 9 wherein said cylindrical surface is segmented, and wherein there is a lens and a projector associated with each segment such that the moving images from a particular projector fall upon its associated segment of said cylindrical surface.

11. The method of claim 5 wherein said plurality of lenses are located spaced around said cylindrical surface.

* * * * *